United States Patent
Giorgi et al.

(10) Patent No.: US 9,409,598 B2
(45) Date of Patent: Aug. 9, 2016

(54) REPLACEABLE COUPLING CARTRIDGE

(75) Inventors: Marshall Giorgi, Lodi, CA (US);
Danny Burgess, Stockton, CA (US)

(73) Assignee: Rare Parts, Inc, Stockton, CA (US)

( * ) Notice: Subject to any disclaimer, the term of this patent is extended or adjusted under 35 U.S.C. 154(b) by 0 days.

(21) Appl. No.: 13/163,324

(22) Filed: Jun. 17, 2011

(65) Prior Publication Data
US 2015/0251695 A1  Sep. 10, 2015

Related U.S. Application Data

(60) Provisional application No. 61/344,242, filed on Jun. 17, 2010.

(51) Int. Cl.
*B62D 7/16* (2006.01)
*F16C 11/00* (2006.01)
*F16B 7/04* (2006.01)

(52) U.S. Cl.
CPC *B62D 7/16* (2013.01); *B62D 7/166* (2013.01); *F16C 11/00* (2013.01); *F16B 7/0413* (2013.01); *Y10T 403/68* (2015.01)

(58) Field of Classification Search
CPC .............. B62D 7/08; B62D 7/16; B62D 7/20; F16D 1/00; F16D 1/12; F16C 11/00; F16C 11/0609; F16C 11/0642; F16C 11/0619
See application file for complete search history.

(56) References Cited

U.S. PATENT DOCUMENTS

| | | | | |
|---|---|---|---|---|
| 2,848,260 A * | 8/1958 | Moskovitz | ...................... | 403/11 |
| 2,900,196 A * | 8/1959 | Nienke | .................... | 280/86.756 |
| 3,059,950 A * | 10/1962 | Hedges | ........................... | 403/74 |
| 3,061,344 A * | 10/1962 | Gray et al. | .................... | 403/125 |
| 3,239,256 A * | 3/1966 | Carter | .............................. | 403/68 |
| 3,791,006 A * | 2/1974 | Robinson | ........................ | 29/283 |
| 4,256,413 A * | 3/1981 | Abe | ............................. | 403/282 |
| 4,568,216 A * | 2/1986 | Mizusawa et al. | ............. | 403/143 |
| 4,613,250 A * | 9/1986 | Laucus | ........................... | 403/11 |
| 4,704,043 A * | 11/1987 | Hackman et al. | ............... | 403/56 |
| 5,885,022 A * | 3/1999 | Maughan et al. | ............. | 403/135 |
| 6,550,120 B1 * | 4/2003 | Maughan et al. | ............. | 29/401.1 |
| 6,644,671 B1 * | 11/2003 | Maughan et al. | ............. | 277/635 |
| 8,757,648 B1 * | 6/2014 | Winter | ..................... | 280/93.511 |
| 2003/0133745 A1 * | 7/2003 | Molenaar | ..................... | 403/143 |

\* cited by examiner

*Primary Examiner* — Daniel Wiley

(57) ABSTRACT

A universal replaceable cartridge for coupling together members of a linkage assembly. The cartridge includes a generally cylindrical body having first and second ends and first and second surfaces. A first threaded portion is formed on the first surface of the cylindrical body adjacent the first end and a second threaded portion is formed on the second surface of the cylindrical body adjacent the second end. The threaded portions allow the cartridge to be threadedly attached to first and second members of the linkage assembly.

2 Claims, 3 Drawing Sheets

Prior Art

REPLACEABLE COUPLING CARTRIDGE

CROSS-REFERENCE TO RELATED APPLICATION

This application claims priority to provisional patent application Ser. No. 61/344,242 filed on Jun. 17, 2010 and entitled "Replaceable Coupling Cartridge. Said application is incorporates by reference herein, in its entirety.

BACKGROUND OF THE INVENTION

The present invention generally relates to the field of mechanical couplings and more particular, is directed to a universal replaceable The present invention generally relates to the field of mechanical couplings and more particular, is directed to a universal replaceable cartridge for coupling together members of a linkage assembly.

Since the early days of mechanics, man has endeavored to combine simple machines in ingenious ways to perform more and more complex and varied work. Simple machines are mechanical devices that are the basic building blocks of all other machines.

Simple machines use a mechanical advantage to multiply a force to do useful work. The inclined plane, screw and wedge are simple machines that rely on the vector resolution of a force to achieve a mechanical advantage. The wheel, lever and pulley are simple machines that rely on equilibrium of torques to achieve a mechanical advantage.

In many cases, the combining of two or more simple machines requires use of some type of interface or coupling device. The coupling device can be a rivet, a weld joint or in fact another simple machine in the form of a screw. As one can imagine, a motor vehicle, for example, employs thousands of simple machines in the form of screws, wheels, pulleys and the like. The screw is used as a fastening device to hold together various assemblies that form the vehicle. Other simple machines, such as wheels and pulleys are, of course, evident in various parts of the vehicle and are indispensible to its operation.

Because machines have moving parts, they are subject to wear, especially at interfaces and coupling locations. In many cases, it is the coupling or interface that wears out and requires replacement long before other elements of the assembly. In the prior art, replacement of a coupling often means replacement of the entire assembly as they are often integrally formed as a signal unit. Replacement of the entire assembly can be time consuming and expensive.

The objective of the present invention is to address the above noted problems in the prior art with respect to replacement of an entire assembly when only a coupling member is in need of replacement.

The novel features of the present invention are set out with particularity in the following detailed description of the preferred embodiment. However, the invention will be understood more fully and clearly from the detailed description of the invention as set forth in the accompanying drawings in which:

DESCRIPTION OF THE PREFERRED EMBODIMENT

A preferred embodiment of the present invention will be described with respect to its use in a tie rod assembly. In most steerable land vehicles, a tie rod assembly is connected to the steering mechanism and to the wheels which steer the vehicle. They are of course indispensible to the safe operation of the vehicle and thus must be very reliable in their operation.

Figure 1:
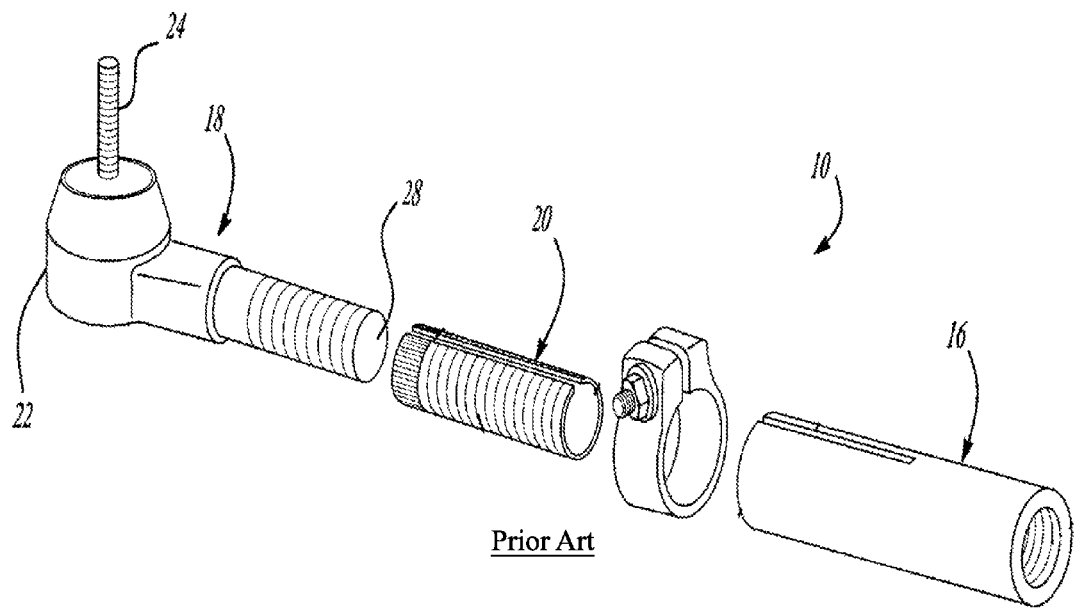
FIG. 1 is an assembly view of a vehicle steering tie rod assembly as known in the prior art.
Figure 2:
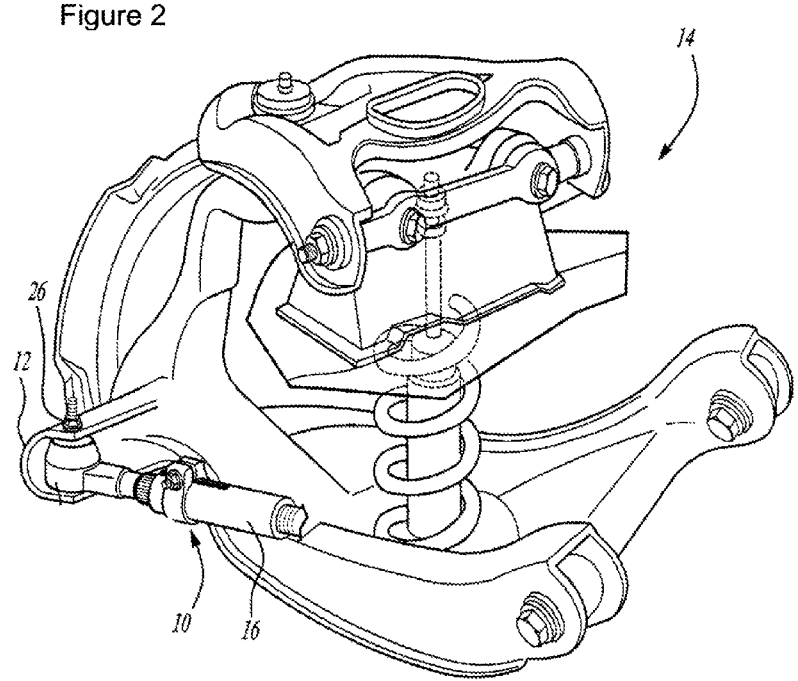
FIG. 2 is an assembly view of a portion of a vehicle steering assembly as known in the prior art.

FIG. 1 illustrates a tie rod assembly 10 as known in the prior art as disclosed in U.S. Pat. No. 6,074,125. The assembly includes an inner tie rod member 16, an outer tie rod end member 18 and an intermediate member 20. Outer tie rod member 18 is adapted to attach to a steering knuckle 12 of a motor vehicle suspension 14 as shown in FIG. 2. Thus, outer tie rod member 18 includes a first end 22 having a threaded rod 24. Rod 24 extends generally perpendicular to the longitudinal axis of tie rod assembly 10 through a hole provided in steering knuckle 12 and is retained with a nut 26 attached to steering knuckle 12.

A second end 28 of outer tie rod member 18 is received by intermediate member 20 which in turn is received by inner tie rod member 16.

The present invention relates specifically to outer tie rod end 18 and threaded rod 24. Threaded rod 24 is subject to wear and corrosion due to its exposure to the elements. Thus, rod 24 must be replaced from time to time. Such replacement is often time consuming and expensive because threaded rod 24 is integrally formed with outer tie rod 18. Thus, in order to replace threaded rod 24, outer tie rod 18 must be replaced as well. Disassembly and reassembly of tie rod 18 from intermediate member 20 requires that the vehicle's steering assembly to be realigned. Realignment adds additional expense to the repair operation.

The present invention avoids the above noted problems by use of a replaceable cartridge for threaded rod 24. The replaceable cartridge allows a fast and simple replacement of a corresponding threaded rod 24 without having to disassemble and reassemble outer tie rod 18 from intermediate member 20. Thus, the vehicle steering assemble does not have to be realigned.

Figure 3:
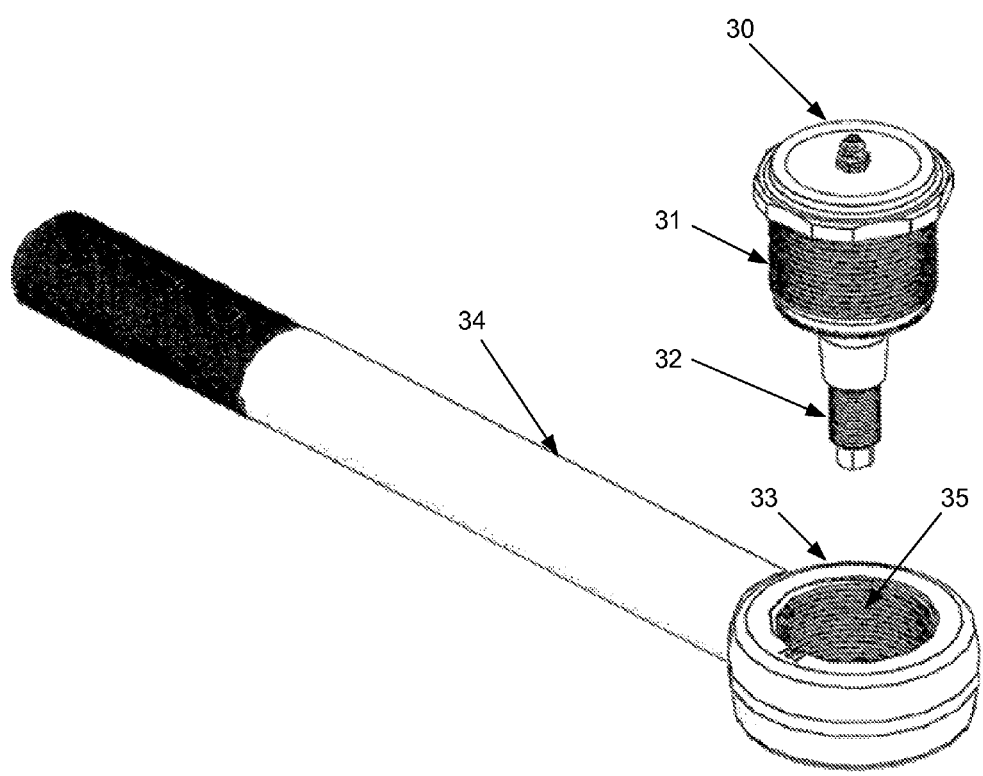
FIG. 3 is an assembly view of a replaceable coupling cartridge and mating assembly end in accordance with the present invention.

FIG. 3 illustrates a replaceable cartridge 30 which has a first threaded portion 31 and a second threaded portion 32. Threaded portion 32 corresponds to threaded rod 24 as illustrated in FIG. 1 and is adapted for attachment to steering knuckle 12 of a motor vehicle suspension 14 as shown in FIG. 2. Replaceable cartridge 30 is adapted for attachment to end 33 of outer tie rod 34. End 33 is formed with a threaded aperture to receive threaded portion 31 of replaceable cartridge 30. Thus, tie rod 34 is connected to the vehicle steering assembly using replaceable cartridge 30. When replaceable cartridge wears and is in need of replacement, it only needs to be disassembled from, for example, knuckle 12 shown in FIG. 2, and from outer tie rod 34. It is not required that outer tie rod 34 be disassembled from intermediate member 20 shown in FIG. 1. Thus, re-alignment of the vehicle's steering assembly will not be required.

Figure 4:
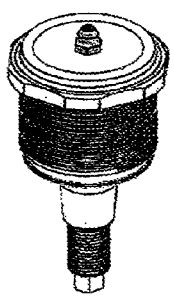
FIGS. 4 and 5 are assembly views of the replaceable coupling cartridge installed from the top and bottom of a vehicle steering tie rod assembly.
Figure 4:
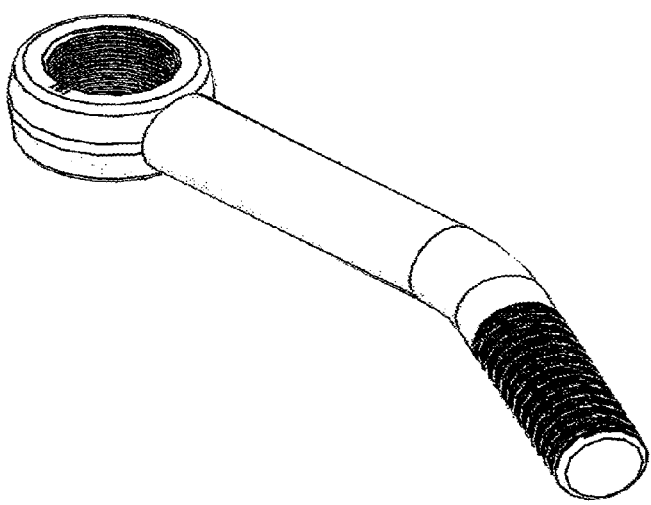
Figure 5:
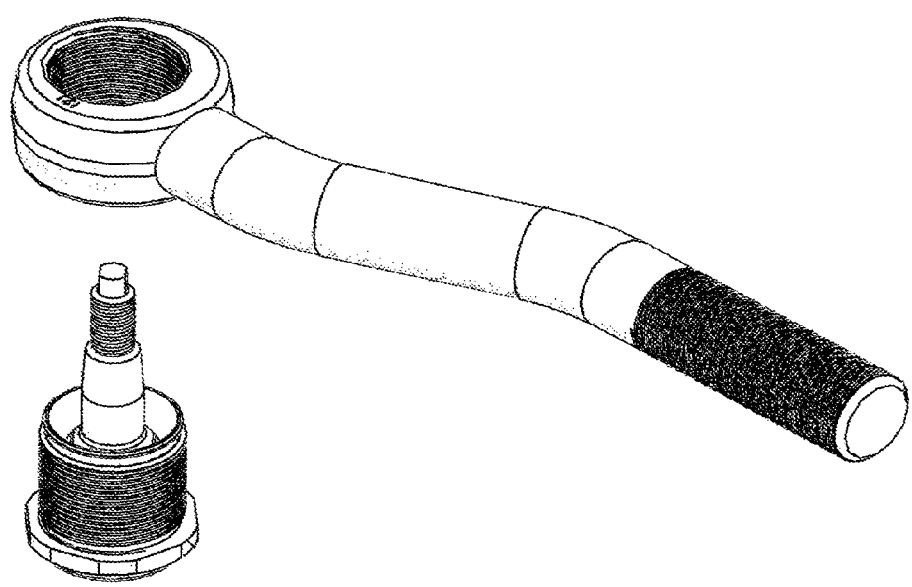

Replacement cartridge 30 can be replaced just about anywhere as long as the user has the proper tools. The design of the cartridge also allows the user to install the cartridge from the top, as shown in FIG. 4, or from the bottom, as shown in FIG. 5, of the outer tie rod end for high steering conversions. The ability to install the cartridge from either direction allows manufactures to reduce the amount of forgings that would otherwise be necessary for the right and left sides of the vehicle. This cuts costs on the amount of forgings necessary for an application. This is also a beneficial design for users that want to use the design for a future high steering conversion.

Tie rod end forgings typically mirror each other from the right side of the vehicle to the left side of the vehicle. The replaceable cartridge of the present invention allows users, depending on the application, to carry just one part to replace all wearable ends of the steering linkage. Replaceable cartridge 30 can be used for the tie rod ends and drag link ends.

Thus, the cartridge of the present invention can be replaced without having to re-align the vehicle. With the replaceable cartridge of the invention, one does not need to unscrew the tie rod end forging from the tie rod sleeve which would cause the vehicle to have to be realigned. By using the replaceable cartridge one would not be changing the alignment of the vehicle.

While the present invention has been described in connection with its use in a vehicle steering assembly, the replaceable cartridge can be used in just about any application where two or more assemblies are joined together.

While the foregoing specification teaches the principles of the present invention, with examples provided for the purpose of illustration, it will be appreciated by one skilled in the art from reading this disclosure that various changes in form and detail can be made without departing from the true scope of the invention.

We claim:

1. A vehicle steering assembly comprising:
    a steering tie rod having first and second ends, wherein said first end includes a threaded opening;
    a steering knuckle; and
    a replaceable cartridge coupling said first end of said steering tie rod to said steering knuckle, wherein said replaceable cartridge comprises:
        a body having a generally cylindrical first end and a generally cylindrical second end, pivotable with respect to the first end, with first and second outer surfaces formed adjacent the first and second ends, respectively;
        a first threaded portion formed on said first outer surface and being threadedly engaged with said threaded opening of said steering tie rod; and
        a second threaded portion formed on said second outer surface and being for threadedly engaged with said steering knuckle,
    wherein said replaceable cartridge maintains the distance between a first predetermined reference point on said steering tie rod and a second predetermined reference point on said steering knuckle approximately the same when a first replaceable cartridge is replaced with a second replaceable cartridge in said vehicle steering assembly.

2. The vehicle steering assembly of claim 1, wherein said replaceable cartridge connects said steering tie rod end to said steering knuckle without disturbing a previous alignment of said vehicle steering assembly.

* * * * *